United States Patent
Walters et al.

(10) Patent No.: US 9,203,307 B2
(45) Date of Patent: Dec. 1, 2015

(54) POWER CONVERTER WITH BIAS VOLTAGE REGULATION CIRCUIT

(71) Applicant: Cree, Inc., Durham, NC (US)

(72) Inventors: Michael Walters, Apex, NC (US); Liqin Ni, Cary, NC (US)

(73) Assignee: Cree, Inc., Durham, NC (US)

( * ) Notice: Subject to any disclaimer, the term of this patent is extended or adjusted under 35 U.S.C. 154(b) by 253 days.

(21) Appl. No.: 13/664,895

(22) Filed: Oct. 31, 2012

(65) Prior Publication Data

US 2014/0119077 A1    May 1, 2014

(51) Int. Cl.
H02M 3/156 (2006.01)
H02M 3/158 (2006.01)
H02M 7/06 (2006.01)
H02M 1/00 (2007.01)

(52) U.S. Cl.
CPC ........... *H02M 3/158* (2013.01); *H02M 7/06* (2013.01); *H02M 2001/0006* (2013.01); *H02M 2001/007* (2013.01); *H02M 2001/0022* (2013.01)

(58) Field of Classification Search
CPC ...... H02M 3/156; H02M 3/1582; H02M 1/08
USPC ........................................................ 323/285
See application file for complete search history.

(56) References Cited

U.S. PATENT DOCUMENTS

| | | | |
|---|---|---|---|
| 4,581,542 A | 4/1986 | Steigerwald | |
| 5,015,836 A | 5/1991 | Van Antwerp | |
| 5,446,366 A | 8/1995 | Bassett et al. | |
| 6,049,234 A | 4/2000 | Miyashita et al. | |
| 6,381,151 B1 | 4/2002 | Jang | |
| 6,621,235 B2 | 9/2003 | Chang | |
| 6,643,144 B2 | 11/2003 | Feldtkeller | |
| 7,102,339 B1 | 9/2006 | Ferguson | |
| 7,345,894 B2 * | 3/2008 | Sawtell et al. | 363/21.11 |
| 7,902,771 B2 | 3/2011 | Shteynberg et al. | |
| 7,906,943 B2 | 3/2011 | Isobe et al. | |
| 7,944,721 B2 | 5/2011 | Yang | |
| 8,004,122 B2 | 8/2011 | Moriarty, Jr. | |
| 8,143,748 B2 | 3/2012 | Ochi | |
| 8,207,713 B2 | 6/2012 | Sugawara | |
| 8,299,724 B2 | 10/2012 | Huynh | |

(Continued)

FOREIGN PATENT DOCUMENTS

| | | |
|---|---|---|
| CN | 201 403 225 Y | 2/2010 |
| CN | 201 418 184 Y | 3/2010 |

(Continued)

OTHER PUBLICATIONS

International Search Report Corresponding to International Application No. PCT/US2012/065533; Date of Mailing: Feb. 5, 2013; 11 Pages.

(Continued)

*Primary Examiner* — Jeffrey Sterrett
(74) *Attorney, Agent, or Firm* — Myers Bigel Sibley & Sajovec, P.A.

(57) ABSTRACT

A power conversion circuit includes a voltage boost circuit configured to generate an output voltage in response to an input voltage, a boost controller configured to control operation of the voltage boost circuit, and a bias voltage generation circuit configured to generate a bias voltage. The bias generation circuit is configured to regulate a level of the bias voltage in response to a level of the input voltage.

21 Claims, 7 Drawing Sheets

(56) References Cited

U.S. PATENT DOCUMENTS

| | | |
|---|---|---|
| 8,587,211 B2 | 11/2013 | Melanson |
| 2001/0024374 A1 | 9/2001 | Ben-Yaakov |
| 2002/0163371 A1* | 11/2002 | Hall et al. .................... 327/175 |
| 2005/0052165 A1 | 3/2005 | Willner et al. |
| 2005/0219870 A1 | 10/2005 | Yang et al. |
| 2006/0125454 A1 | 6/2006 | Chen et al. |
| 2006/0186866 A1 | 8/2006 | Sharma |
| 2007/0103949 A1 | 5/2007 | Tsuruya |
| 2008/0067993 A1 | 3/2008 | Coleman |
| 2008/0272748 A1 | 11/2008 | Melanson |
| 2009/0261748 A1 | 10/2009 | McKinney et al. |
| 2010/0007999 A1* | 1/2010 | Iwata ............................. 361/18 |
| 2010/0045210 A1 | 2/2010 | Hariharan |
| 2010/0123978 A1* | 5/2010 | Lin et al. ......................... 361/18 |
| 2010/0164406 A1 | 7/2010 | Kost et al. |
| 2010/0201336 A1 | 8/2010 | Chen et al. |
| 2010/0308738 A1 | 12/2010 | Shteynberg et al. |
| 2010/0309689 A1* | 12/2010 | Coulson ......................... 363/16 |
| 2011/0074292 A1 | 3/2011 | Maehara |
| 2011/0095691 A1 | 4/2011 | Nakajo |
| 2011/0148200 A1 | 6/2011 | Burns et al. |
| 2011/0149614 A1 | 6/2011 | Stracquadaini |
| 2011/0227490 A1 | 9/2011 | Huynh |
| 2011/0248640 A1 | 10/2011 | Welten |
| 2011/0279044 A1 | 11/2011 | Maiw |
| 2012/0013259 A1 | 1/2012 | Jin |
| 2012/0038418 A1 | 2/2012 | Akyol et al. |
| 2012/0049825 A1 | 3/2012 | Chen et al. |
| 2012/0154042 A1 | 6/2012 | Nadimpalli et al. |
| 2012/0274290 A1 | 11/2012 | Ye et al. |
| 2012/0319604 A1 | 12/2012 | Walters |
| 2013/0162149 A1 | 6/2013 | Van de Ven et al. |
| 2013/0241430 A1 | 9/2013 | Lee et al. |
| 2013/0307415 A1 | 11/2013 | Ni |
| 2014/0043877 A1 | 2/2014 | Ishii |
| 2014/0049181 A1 | 2/2014 | Kelly et al. |
| 2014/0091724 A1 | 4/2014 | Palmer |

FOREIGN PATENT DOCUMENTS

| | | |
|---|---|---|
| CN | 201 700 061 U | 1/2011 |
| CN | 102 105 007 Y | 6/2011 |
| JP | 2007-059205 A | 3/2007 |
| JP | 2008-130523 A | 6/2008 |
| JP | 2010-187429 A | 8/2010 |

OTHER PUBLICATIONS

ST Microelectronics, L6561 Power Factor Corrector Datasheet, Jun. 2004, retrieved Mar. 2, 2013 at URL: http://www.st.com/web/en/resource/technical/document/datasheet/CD00001174.pdf.

Notification of Transmittal of the International Search Report and the Written Opinion of the International Searching Authority, or the Declaration, PCT/US2013/067211, Date of Mailing: Mar. 27, 2014, 13 pages.

Notification of Transmittal of the International Search Report and the Written Opinion of the International Searching Authority, or the Declaration, PCT/US13/58682, Date of Mailing: Feb. 7, 2014, 21 pages.

Chinese First Office Action Corresponding to Chinese Patent Application No. 201280065683.8; Date of Notification: Apr. 3, 2015; Foreign Text, 10 Pages, English Translation Thereof, 10 Pages.

Japanese Office Action Corresponding to Japanese Patent Application No. 2014-543507; Dispatch Date: Apr. 27, 2015; Foreign Texts, 4 Pages, English Translation Thereof, 4 Pages.

* cited by examiner

POWER CONVERTER WITH BIAS VOLTAGE REGULATION CIRCUIT

TECHNICAL FIELD

The present disclosure relates to power converter circuits, and more particularly to power converter circuits that generate an auxiliary bias power.

BACKGROUND

Power converters, or power supplies, may be used in electronic applications to convert an input voltage to a desired power to power one or more electronic devices. Some power supplies may be classified as either a linear power supplies or a switched-mode power supply (SMPS).

Switched-mode power supplies may be configured to operate more efficiently than linear power supplies. A switched-mode power supply may include a switch that, when switching on and off, stores energy in an inductor and discharges the stored energy to an output of the switched mode power supply. The switch may be controlled by a controller, which outputs switching signals to turn the switch on and off.

Power supplies may generate an auxiliary bias power that is used to power various circuits of the power supply itself, such as, for example, a digital controller that controls the level of the voltage output by the power supply.

SUMMARY

A power conversion circuit according to some embodiments includes a voltage boost circuit configured to generate an output voltage in response to an input voltage, a boost controller configured to control operation of the voltage boost circuit, and a bias voltage generation circuit configured to generate a bias voltage. The bias generation circuit is configured to regulate a level of the bias voltage in response to a level of the input voltage.

The bias voltage generation circuit may be configured to detect the level of the input voltage and to increase the level of the bias voltage in response to detecting that the input voltage is below a threshold voltage level.

The boost controller may be configured to generate a pulse width modulation signal that controls operation of a switch in the voltage boost circuit. The bias voltage generation circuit may be configured to detect the level of the input voltage by measuring an on-time of the pulse width modulation signal.

In some embodiments, the bias voltage generation circuit may include a comparator that is configured to compare a level of the input voltage with the threshold voltage level.

The voltage boost circuit may include a boost inductor configured to receive a rectified input voltage, a boost diode coupled to the boost inductor a boost capacitor coupled to the boost diode, and a compound switch including a first switch coupled to the boost inductor and a second switch coupled to the first switch. The boost controller may be configured to control a state of the second switch. The bias voltage generation circuit may include a bias capacitor coupled to a bias node, a bias rectifier coupled between the first switch and the bias node, and a switch between a control terminal of the first switch and the bias node. The bias generation circuit may be configured to disconnect the control terminal of the first switch from the bias node in response to detecting that the input voltage is below the threshold voltage level.

The power conversion circuit may further include a control bias circuit coupled to the control terminal of the first switch and configured to maintain a voltage on the control terminal of the first switch at a voltage level that is higher than a voltage level at the bias node when the control terminal of the first switch is disconnected from the bias node.

The bias generation circuit may be configured to maintain the first switch in an on-state by disconnecting the control terminal of the first switch from the bias node when either the level of the input voltage is below the threshold voltage level or the voltage level at the bias node is below a lower bias voltage threshold.

The bias generation circuit may be configured to compare the voltage at the bias node to an upper bias voltage threshold and to connect the control terminal of the first switch to the bias node in response to detecting that the voltage at the bias node is greater than the upper bias threshold voltage.

The bias generation circuit may be further configured to compare a level of a current in the boost inductor to a current threshold and to connect the control terminal of the first switch to the bias node in response to the current in the boost inductor exceeding the current threshold.

Some embodiments provide methods of operating a power conversion circuit. The methods include generating an output voltage in response to an input voltage, and generating a bias voltage for powering a control circuit. A level of the bias voltage is regulated in response to a level of the input voltage.

The methods may further include detecting the level of the input voltage, and increasing the level of the bias voltage in response to detecting that the input voltage is below a threshold voltage level.

The methods may further include generating a pulse width modulation signal that controls operation of a switch in the power conversion circuit, and detecting the level of the input voltage by measuring an on-time of the pulse width modulation signal.

The methods may further include comparing a level of the input voltage with the threshold voltage level.

The switch may include a compound switch including a first switch coupled to a boost inductor and a second switch coupled to the first switch, and the methods may further include disconnecting a control terminal of the first switch from a bias node at which the bias voltage is output in response to detecting that the input voltage is below a threshold voltage level.

The methods may further include maintaining a voltage on the control terminal of the first switch at a voltage level that is higher than a voltage level at the bias node when the control terminal of the first switch is disconnected from the bias node.

The methods may further include maintaining the first switch in an on-state by disconnecting the control terminal of the first switch from the bias node when either the level of the input voltage is below the threshold voltage level or the voltage level at the bias node is below a lower bias voltage threshold.

The methods may further include comparing the voltage at the bias node to an upper bias voltage threshold and connecting the control terminal of the first switch to the bias node in response to detecting that the voltage at the bias node is greater than the upper bias threshold voltage.

The methods may further include, comparing a level of a current in the boost inductor to a current threshold, and connecting the control terminal of the first switch to the bias node in response to the current in the boost inductor exceeding the current threshold.

A power conversion circuit according to further embodiments includes a voltage boost circuit configured to generate an output voltage in response to a rectified input voltage signal. The voltage boost circuit includes a first energy storage element, a boost controller configured to control operation of the voltage boost circuit, and a bias voltage generation circuit configured to generate a bias voltage for operating the boost controller. The bias generation circuit includes a second energy storage element, and the bias generation circuit is configured to transfer energy from the first energy storage element to the second energy storage element in response to a level of the rectified input voltage signal being below a threshold voltage level.

A power conversion circuit according to some embodiments includes a voltage boost circuit configured to generate an output voltage in response to an input voltage. The voltage boost circuit includes a cascade switch including a high voltage switch and a control switch. The high voltage switch includes an enhancement mode MOSFET. The power conversion circuit further includes a boost controller configured to control operation of the control switch and a bias voltage generation circuit coupled to a gate and to a source of the high voltage switch. The bias voltage generation circuit is configured to provide a first gate voltage to the gate of the high voltage switch that is sufficient to turn on the high voltage switch when the control switch is in an ON state. A gate bias circuit is coupled to the gate of the high voltage switch and to an output terminal of the voltage boost circuit. The gate bias circuit is configured to provide a second gate voltage to the gate of the high voltage switch that is higher than the first gate voltage.

The second gate voltage may be sufficient to turn on the high voltage switch when the control switch is in an OFF state.

Each of the first gate voltage and the second gate voltage may be sufficient to place the control switch into a saturated mode.

In some embodiments, the bias voltage generation circuit may include a bias capacitor having a first terminal coupled to a bias voltage supply node and a second terminal coupled to ground, and a bias selection switch coupled between the bias voltage supply node and the gate of the high voltage switch. The source of the high voltage switch may be coupled to the bias voltage supply node, and the bias voltage generation circuit may be configured to selectively couple the gate of the high voltage switch to the bias supply node through the bias selection switch in response to a voltage level at the bias supply node.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

BRIEF DESCRIPTION OF THE DRAWINGS

The accompanying drawings are included to provide a further understanding of the disclosure and are incorporated in and constitute a part of this application. In the drawings.

DETAILED DESCRIPTION

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
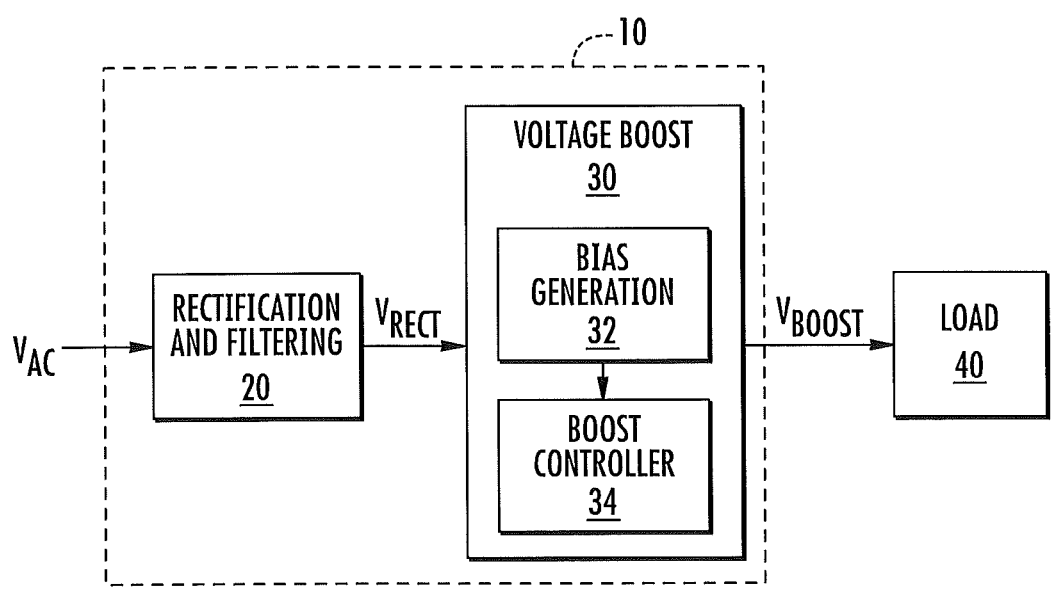
FIG. 1 is a block diagram of a power converter circuit according to some embodiments.

FIG. 1 illustrates a power converter 10 according to some embodiments. The power converter 10 receives an AC input voltage VAC (which may, for example be a 110, 220 or 240 volt AC line voltage) and converts the input voltage to a boosted DC signal VBOOST that is used to drive a load 40. The power converter 10 includes a rectification and filtering circuit 20 that generates a rectified and filtered voltage VRECT in response to the input voltage, and a voltage boost circuit 30 that generates the boosted DC signal VBOOST in response to the rectified and filtered voltage VRECT. The power converter 10 may be a switch-mode power supply implemented as a boost converter. However, it will be appreciated that the power converter 10 may be implemented as a buck or flyback converter. Also, although shown as an AC-DC converter, it will be appreciated that the voltage converter may be implemented as a DC-DC converter or an AC-AC converter.

Some embodiments are illustrated in connection with a simple boost converter supplying a generic load. However the circuits/methods disclosed herein may also be adapted for use with Ćuk and Single-ended primary-inductor converter (SEPIC) converters.

Switch-mode power supplies may be used in various applications, such as lighting applications. For example, switch-mode power supplied may be used to power a light source, such as one or more light-emitting diodes (LEDs). The LEDs may be connected to an output of the switch-mode power supply and/or may be configured as an output load of the switch-mode power supply. In addition, the LEDs may be powered by a direct current (DC) signal having a DC voltage. In one example, the DC voltage may be approximately 200 volts, although other voltages may be used to power the LEDs. In some example configurations, the switch-mode power supply may include and/or be connected to a rectifier that converts an alternating current (AC) signal to a rectified AC signal. As an example, the rectifier may receive a 120 volt AC signal, such as from a wall outlet, and convert the 120 volt ac signal to a rectified 120 volt AC signal. The switch-mode power supply may then convert the rectified ac signal to a dc signal, such as a 200 volt DC signal, to power the LEDs.

The voltage boost circuit 30 includes a boost controller 34 and a bias voltage generation circuit 32 that generates a bias voltage that is supplied to the boost controller 34 for powering the boost controller 34.

Figure 2:
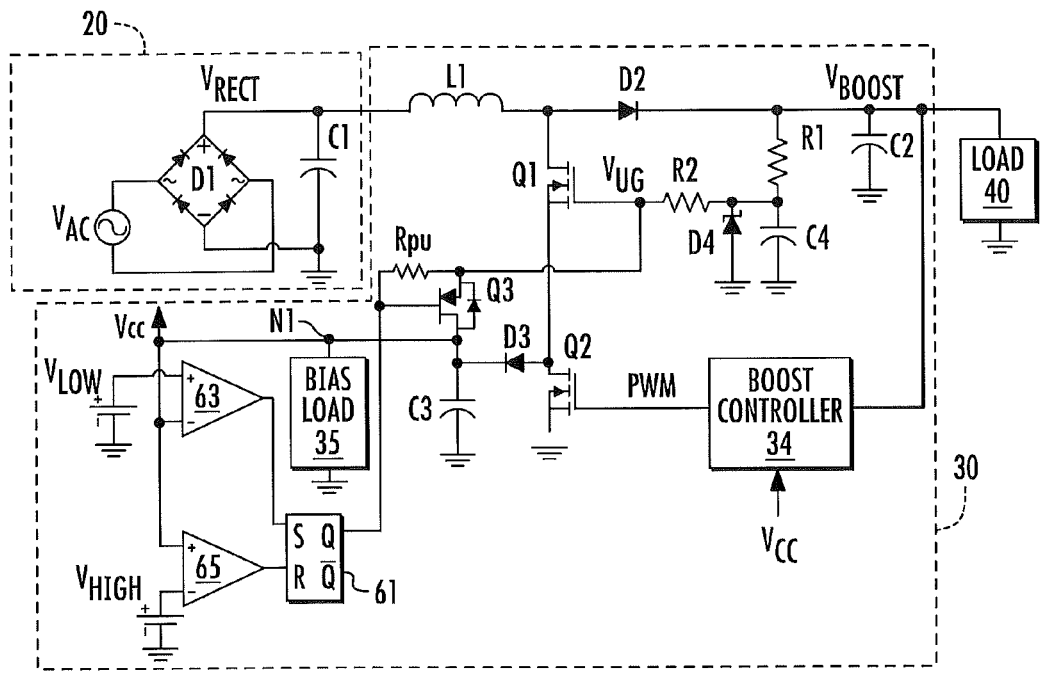
FIG. 2 is a circuit diagram of a power converter circuit according to some embodiments.

FIG. 2 is a circuit diagram that illustrates the rectification and filtering circuit 20 and the boost circuit 30 in more detail. In FIG. 2, the input voltage VAC is shown as a sinusoidal voltage generator. However, it will be appreciated that the input voltage may be a DC voltage.

The rectification and filtering circuit 20 includes a rectifier D1 and a capacitor C1 that supply the rectified input voltage $V_{RECT}$. Other elements, including active and/or passive components may be included in the rectification and filtering circuit.

The boost circuit 30 includes an energy storage element, namely boost inductor L1, a high voltage switch Q1, a control switch Q2, a boost rectifier D2, a boost capacitor C2 and a boost controller 34. The high voltage switch Q1 may be a high voltage MOSFET, while the control switch Q2 may be a low voltage MOSFET. In some embodiments, either or both of the high voltage switch Q1 and the control switch Q2 may be implemented as NPN transistors or other types of transistors. These elements operate to convert the rectified input voltage $V_{RECT}$ to a high voltage DC signal $V_{BOOST}$ that can be used to drive the load 40.

In particular, the switches Q1 and Q2 form a cascade switch that is coupled to the boost inductor L1. The gate of the high voltage switch Q1 is coupled to a bias voltage $V_{CC}$ at a bias supply node N1, while the source is coupled to the bias voltage $V_{CC}$ at the bias supply node N1 through a diode D3 when control switch Q2 is off. Thus, under normal operating conditions, when control switch Q2 is off, the high voltage switch Q1 is also off.

In some embodiments, the high voltage switch Q1 may be an n-channel enhancement mode MOSFET that may be operated in a switched mode rather than a linear mode. Previous power conversion circuits that utilize a cascade switch may require that the high voltage switch be a depletion mode device, or may require a charge pump to be provided along with an enhancement mode device to supply a sufficient gate voltage to the high voltage switch. In contrast, in the embodiments illustrated in FIG. 2, a gate voltage may be supplied to the high voltage switch Q1 while it charges a bias capacitor C3 by a voltage bias circuit including the Zener diode D4, the resistor R1 and the capacitor C4, as discussed in more detail below.

When the control switch Q2 is turned on in response to a signal, such as a pulse width modulation (PWM) signal, generated by the boost controller 34, the source of the high voltage switch Q1 is coupled to ground, which turns on the high voltage switch Q1 on and causes current in the boost inductor L1 to increase. When the control switch Q2 is turned off in response to the PWM signal, the high voltage switch Q1 also turns off, causing the current flowing in the boost inductor L1 to flow through the boost rectifier D2 and supply the boost capacitor C2, which provides the boost voltage $V_{BOOST}$ to the load 40.

The boost controller 34 regulates the load power by controlling the state of the switches Q1 and Q2 using the PWM signal.

In conventional power conversion circuits including a cascade switch, the high voltage switch may operate in a linear mode rather than a switched mode. This may reduce the efficiency of the power conversion circuit. In contrast, the high voltage switch Q1 may operate in a switched mode in which the switch Q1 transitions between an 'off' state and an 'on' (saturated) state in response to the gate voltage and the state of the control switch Q2.

In addition to generating the output voltage $V_{BOOST}$, the boost circuit 30 also generates a bias voltage $V_{CC}$ that is used to provide a gate voltage to the high voltage switch Q1 and that is also used to provide bias or housekeeping power to other portions of the voltage converter 10, such as the boost controller 34. As the bias voltage is used to power various elements of the boost circuit 30, it is desirable to periodically refresh the bias voltage to ensure that it does not drop below a desired level. According to some embodiments, additional circuitry is provided in the boost circuit 30 to generate the bias voltage.

In the embodiments illustrated in FIG. 2, the bias voltage generating circuitry may be provided by an enhancement mode p-type MOSFET (PFET) switch Q3, resistors R1 and R2, Zener diode D4, capacitors C3, C4, comparators 63, 65, and a latch 61. The capacitor C3 is an energy storage element that provides an output voltage at a bias node Vcc. The PFET switch Q3 connects/disconnects the bias supply node N1 from the gate of the high voltage switch Q1 depending on the state of the bias voltage at the bias supply node N1. The resistors R1 and R2, the Zener diode D4 and the capacitor C4 provide a gate bias voltage circuit that biases the gate voltage on the gate of the first switch Q1 when the gate is not connected to the bias supply node N1. The comparators 63, 65 and latch 61 control operation of the PFET switch Q3 based on the level of the bias voltage.

For normal cascade switch operation, the gate of the high voltage switch Q1 is connected to the bias voltage $V_{CC}$ at the bias supply node N1, and the control switch Q2 controls both the turn 'on' and turn 'off' of the high voltage switch Q1.

According to some embodiments, the bias voltage $V_{CC}$ is periodically recharged in an asynchronous manner by causing the high voltage switch Q1 to remain 'on' for a time interval after the control switch Q2 turns 'off' During this time interval, the current in the boost inductor L1 flows through Q1 and D3 to recharge capacitor C3, thereby causing the bias voltage $V_{CC}$ to increase. The high voltage switch Q1 is caused to remain 'on' by increasing the gate voltage $V_{UG}$ on the high voltage switch Q1 to a level sufficiently above the level of the bias voltage $V_{CC}$. In some embodiments, the gate voltage $V_{UG}$ on the high voltage switch Q1 may be set at a level that is sufficient to place the high voltage switch Q1 into saturation.

A gate voltage sufficient to turn on the high voltage switch Q1 is provided by the resistor R1 and the Zener diode D4. The voltage on the Zener diode D4 is chosen to be above the Vcc voltage level and fully enhance the transistor Q1 when the transistor Q3 is 'off.'. However, when the transistor Q3 is 'on,' the gate of the high voltage switch Q1 is connected to the bias supply node N1, causing the bias voltage $V_{CC}$ to appear at the gate $V_{UG}$ of the high voltage switch Q1. When the transistor Q3 is turned off, the gate $V_{UG}$ of the high voltage switch Q1 is disconnected from the bias supply node N1, and the voltage on the gate $V_{UG}$ of the high voltage switch Q1 rises to the level of the voltage on the Zener diode D4 ($V_{D4}$).

Accordingly, the bias voltage $V_{CC}$ may be periodically recharged by turning 'off' the switch Q3 and allowing the gate voltage $V_{UG}$ to increase to the voltage level $V_{D4}$ on the Zener diode D4. The control switch Q2 turns 'on' when the PWM signal is HIGH, pulling the source of the high voltage switch Q1 low and turning on the high voltage switch Q1. Both switches Q1 and Q2 conduct the current through the boost inductor L1. When the PWM signal transitions LOW, the control switch Q2 turns off. However, because the voltage $V_{UG}$ on the gate of the high voltage switch Q1 is set at $V_{D4}$, the high voltage switch Q1 remains 'on' in a saturated condition for a short interval, delivering the inductor current to the bias capacitor C3 which supplies the bias load 35. The high voltage switch Q1 is subsequently turned 'off' by turning 'on' the switch Q3, causing the voltage $V_{UG}$ at the gate of the high voltage switch Q1 to drop to the level of the bias voltage $V_{CC}$.

In a hysteretic mode of operation, the bias voltage may be maintained within a desired range defined by threshold voltages $V_{LOW}$ and $V_{HIGH}$, which are supplied to the inverting (−) and non-inverting (+) inputs, respectively, of the comparators 65 and 63. The bias voltage $V_{CC}$ is supplied to the non-inverting (+) and inverting (−) inputs, respectively, of the comparators 65 and 63. Accordingly, the comparator 63 outputs a high voltage when the bias voltage $V_{CC}$ falls below the threshold voltage $V_{LOW}$, and the comparator 65 outputs a high voltage when the bias voltage $V_{CC}$ rises above the threshold voltage $V_{HIGH}$. The output of the comparator 63 is connected to the SET input of the latch 61, while the output of the comparator 65 is connected to the RESET input of the latch 61.

When the bias capacitor C3 discharges and $V_{CC}$ falls below $V_{LOW}$, the comparator 63 outputs a high voltage, which sets the output Q of the latch 61 HIGH, causing the PFET Q3 to turn off. The gate voltage $V_{UG}$ on the high voltage switch Q1 then increases to the voltage level $V_{D4}$ of the Zener diode D4. After the next PWM cycle, the high voltage switch Q1 remains 'on' as described above and the inductor current charges the bias capacitor C3.

Once the bias voltage $V_{CC}$ increases to the level of $V_{HIGH}$, the comparator 65 outputs a high voltage, causing the latch 61 to output a low voltage. This causes the switch PFET switch Q3 to turn 'on' which reduces the gate voltage $V_{UG}$ to the level $V_{CC}$ and turns the high voltage switch Q1 'off'. The bias capacitor C3 supplies a voltage to the bias load 35. When the bias capacitor C3 discharges to the $V_{LOW}$ threshold, the bias recharge cycle repeats.

Figure 3:
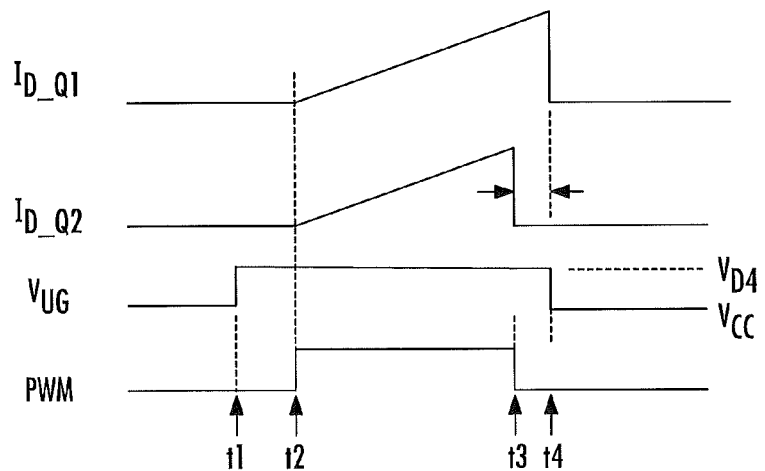
FIG. 3 is a conceptual timing diagram illustrating the timing of various voltage and current signals within a power converter circuit according to some embodiments.

FIG. 3 is a schematic timing diagram showing relative levels of current flowing through the switches Q1 ($I_{D\_Q1}$) and Q2 ($I_{D\_Q2}$) as well as the voltage $V_{UG}$ on the gate of the high voltage switch Q1 and the level of the PWM control signal, according to some embodiments.

Referring to FIG. 3, at time t1 the bias voltage $V_{CC}$ may fall below a predetermined threshold level ($V_{LOW}$). In response, the output of the latch 61 is set to HIGH, causing the PFET switch Q3 to turn off. This allows the gate voltage $V_{UG}$ on the high voltage switch Q1 to increase to the voltage level $V_{D4}$ that is sufficient to turn on the high voltage switch Q1.

When the PWM signal goes high at time t2, the control switch Q2 turns on, causing the inductor current (and hence the current ID_Q1 and ID_Q2 through the switches Q1 and Q2) to increase. When the PWM signal goes low at time t3, the current ID_Q2 through the control switch Q2 drops to zero. However, because the voltage $V_{UG}$ on the gate of the high voltage switch Q1 is clamped at $V_{D4}$, the current ID_Q1 through the high voltage switch Q1 continues to flow, charging the bias capacitor C3 through the diode D3.

Because the voltage level $V_{UG}$ on the gate of the high voltage switch Q1 is raised to $V_{D4}$ only when the level of the bias voltage $V_{CC}$ falls below a threshold voltage $V_{LOW}$, the recharge of the bias voltage may not occur every PWM cycle.

Figure 4:
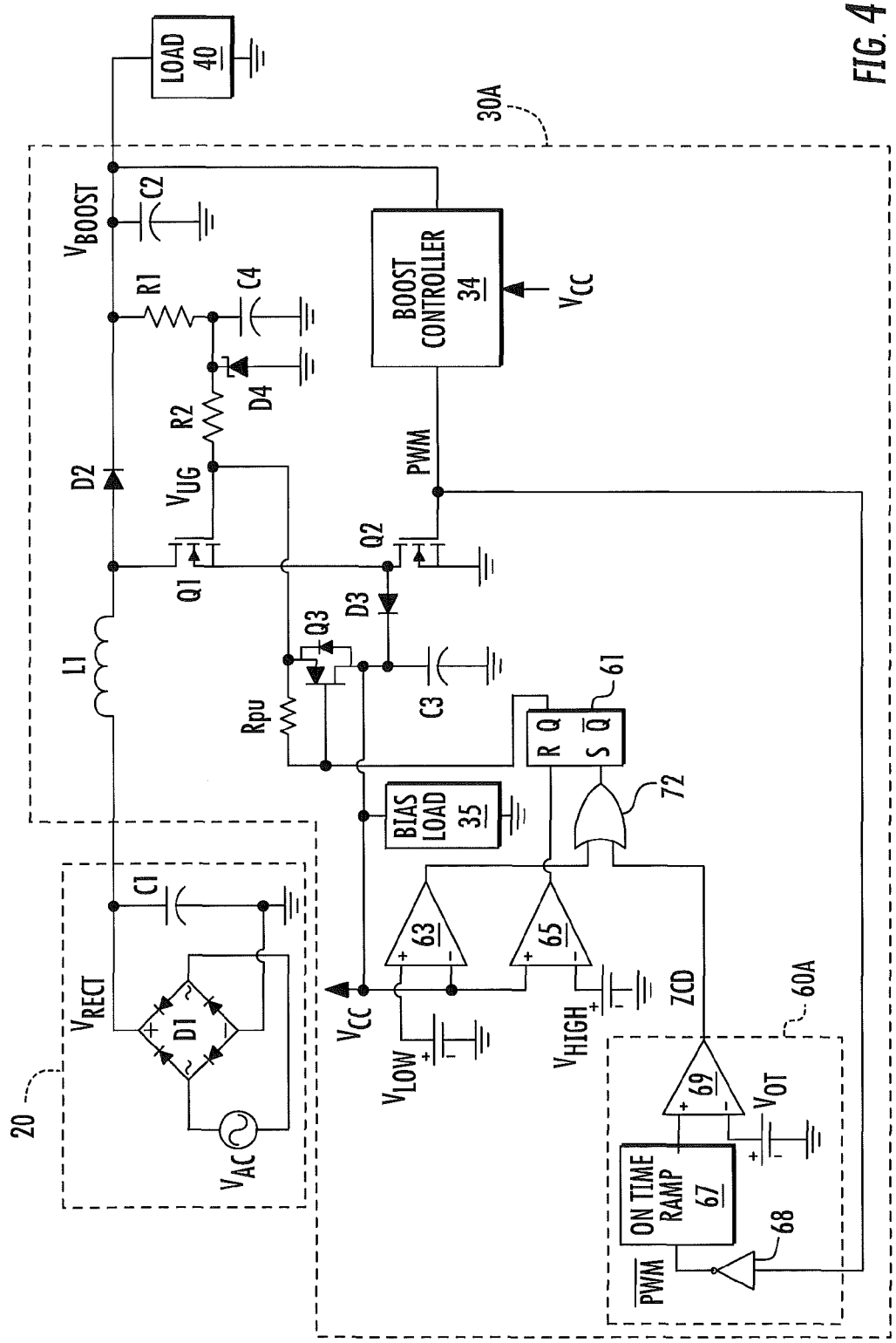
FIG. 4 is a circuit diagram of a power converter circuit according to further embodiments.

FIG. 4 illustrates a voltage boost circuit 30A that recharges the bias voltage in a synchronized mode. In particular, the bias voltage is recharged near the zero crossings of the rectified input voltage $V_{RECT}$. However, the recharge of the bias voltage still may not occur every PWM cycle.

In particular, the voltage boost circuit 30A includes a zero crossing detector 60A that detects when the rectified input voltage $V_{RECT}$ is near zero, and responsively initiates a recharge of the bias voltage $V_{CC}$.

In FIG. 4, the output of the comparator 63 is provided to an input of an OR-gate 72. An output of the zero crossing detector 60A is connected to another input of the OR-gate 72, and the output of the OR-gate 72 is provided to the SET input of the latch 61. Thus, when either the output of the comparator 63 goes HIGH (in response to the bias voltage $V_{CC}$ falling below $V_{LOW}$) or when the output of the zero crossing detector 60A goes high (in response to detecting that the rectified input voltage $V_{RECT}$ is near zero), the output of the latch 61 will be set to HIGH, causing the PFET switch Q3 to turn off and allowing the voltage $V_{UG}$ on the gate of the high voltage switch Q1 to rise and turn the high voltage switch Q1 'on'.

The zero crossing detector 60A includes an inverter 68, an on-time ramp circuit 67 that generates a ramp voltage in response to the PWM signal, and a comparator 69 that compares the level of the ramp voltage with a threshold voltage $V_{OT}$.

The zero crossing detector 60A takes advantage of a characteristic of several popular PWM modulators, namely, that the on-time of the PWM signal (i.e., the time during which PWM=HIGH) increases near the AC zero crossing. The zero crossing detector 60A monitors the time interval during which PWM=HIGH during which the on-time ramp voltage increases linearly. Once the on-time ramp voltage exceeds the threshold voltage $V_{OT}$, the output signal ZCD of the zero cross detection circuit 60A transitions to HIGH, which sets the output of the latch 61 to HIGH and turns Q3 'off.' As noted above, this allows the gate voltage $V_{UG}$ on the high voltage switch Q1 to charge up to the voltage level $V_{D4}$. After the next PWM cycle, the high voltage switch Q1 remains 'on' as described above and the inductor current recharges the bias capacitor C3.

The latch 61 is reset once the voltage level of $V_{CC}$ reaches $V_{HIGH}$. This turns the PFET switch Q3 'on', causing the gate voltage $V_{UG}$ on the high voltage switch Q1 to drop to the voltage level $V_{CC}$, which turns Q1 'off'.

The zero cross detection signal ZCD may be HIGH for multiple PWM cycles. The PFET switch Q3 will then cycle 'on' and 'off' each switching cycle to extend the conduction interval of the high voltage switch Q1 past the conduction interval of the control switch Q2, and thereby maintain the charge on the bias capacitor C3. This burst of recharging stops once the zero cross detection signal ZCD transitions to LOW. The bias capacitor C3 supplies the bias load, and the recharge cycle is repeated at the next zero cross detection (before $V_{CC}$ discharges to $V_{LOW}$).

Figure 5:
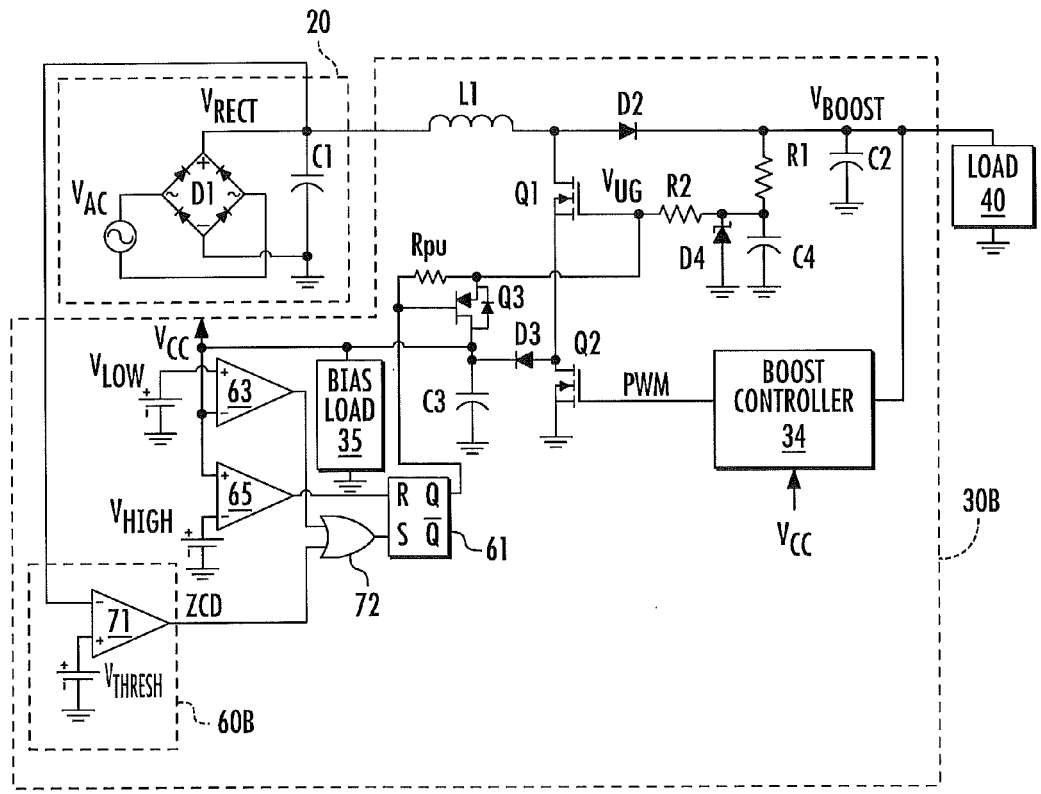
FIG. 5 is a circuit diagram of a power converter circuit according to further embodiments.

FIG. 5 illustrates a voltage boost circuit 30B having a zero crossing detector 60B configured according to further embodiments. In particular, the zero crossing detector 60B includes a comparator 71 that compares the level of the rectified input voltage $V_{RECT}$ with a threshold voltage $V_{THRESH}$ and outputs a HIGH voltage level when the rectified input voltage $V_{RECT}$ drops below the level of the threshold voltage $V_{THRESH}$.

Figure 6:
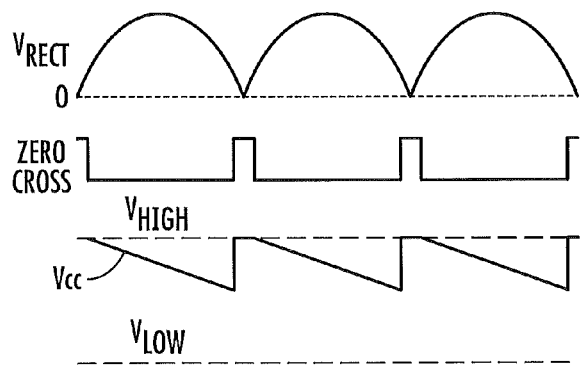
FIG. 6 is a conceptual graph of a bias voltage level Vcc generated by a voltage converter circuit according to some embodiments.

FIG. 6 is a timing diagram illustrating the rectified input voltage $V_{RECT}$, the zero cross detection signal ZCD, and the bias voltage $V_{CC}$. As shown therein, the zero cross detection signal ZCD goes high when the rectified input voltage $V_{RECT}$ is near zero. At that time, the bias voltage $V_{CC}$ is recharged to the high voltage level $V_{HIGH}$, which may occur before the bias voltage $V_{CC}$ drops to the level $V_{LOW}$.

Figure 7:
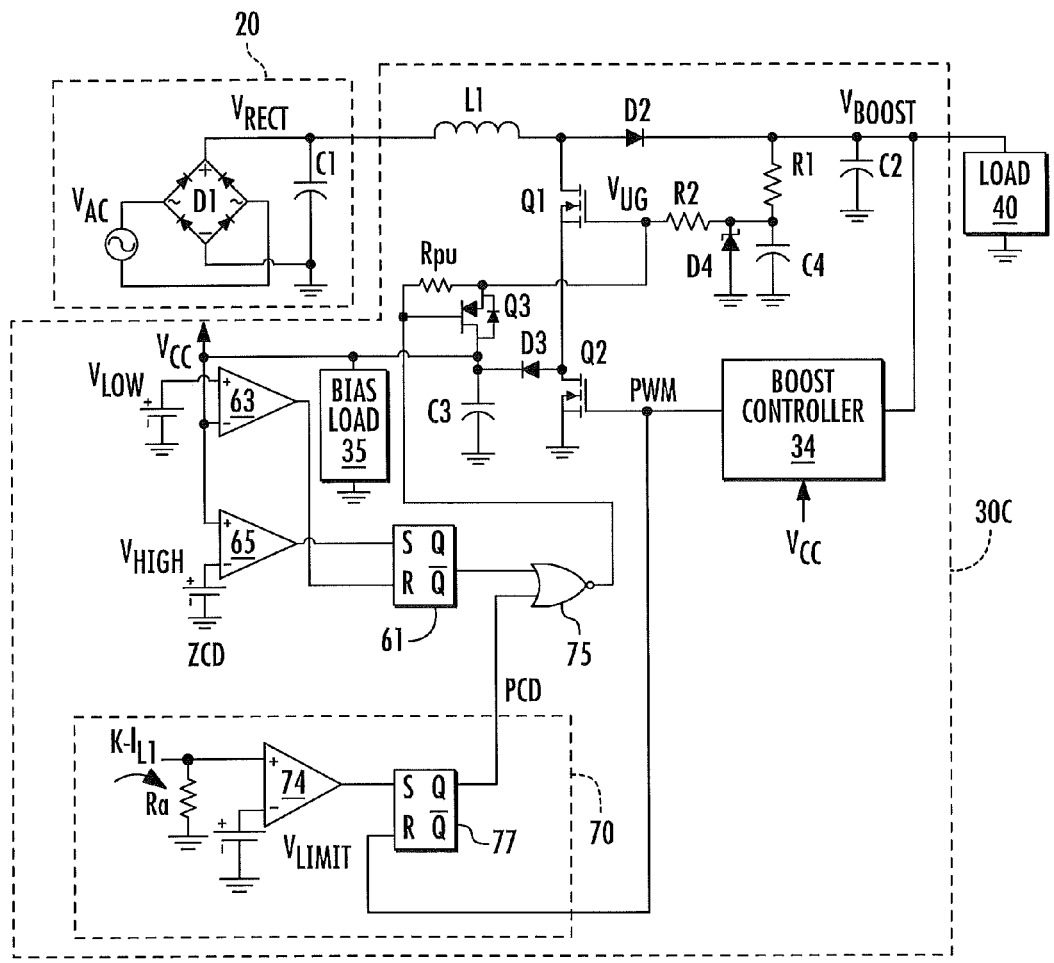
FIG. 7 is a circuit diagram of a power converter circuit according to further embodiments.

FIG. 7 is a schematic circuit diagram of a voltage boost circuit 30C according to further embodiments. The voltage boost circuit 30C includes a peak current detector 70 that detects when a level of the inductor current $I_{L1}$ exceeds a predetermined peak level and turns off the high voltage switch Q1 in response.

In the voltage boost circuit 30C, the output of the comparator 63 may be connected to the RESET input of the latch 61, while the output of the comparator 65 is connected to the SET input of the latch 61. The output PCD of the peak current detector 70 and the output of the latch 61 are provided as inputs to a NOR-gate 75, the output of which is connected to the gate of the PFET switch Q3.

The peak current detector 70 includes a sense resistor Ra that senses a scaled copy of the inductor current, i.e., a current $K \cdot I_{L1}$ that is proportional to the current $I_{L1}$ through the boost inductor. The voltage on the sense resistor Ra is compared by a comparator 74 to a voltage threshold limit $V_{LIMIT}$, and the output of the comparator 74 is provided to the SET input of a Peak Limit latch 77. The RESET input of the Peak Limit latch 77 is connected to the PWM signal output by the boost controller 34.

If the inductor current exceeds the threshold the latch 77 is set to HIGH, which sets the peak current detect signal PCD to HIGH and turns the PFET switch Q3 'on.' This reduces the gate voltage $V_{UG}$ on the high voltage switch Q1 to the voltage level $V_{CC}$ (with the control switch Q2 'off') and turns the high voltage switch Q1 'off'. The peak limit latch 77 is reset every switching cycle (when PWM=HIGH) by the PWM signal that is connected to the RESET input of the peak pimit latch 77. The energy delivered to the bias capacitor C3 may therefore be limited, and several switching cycles may be needed to restore the charge at the bias supply node N1.

Figure 8:
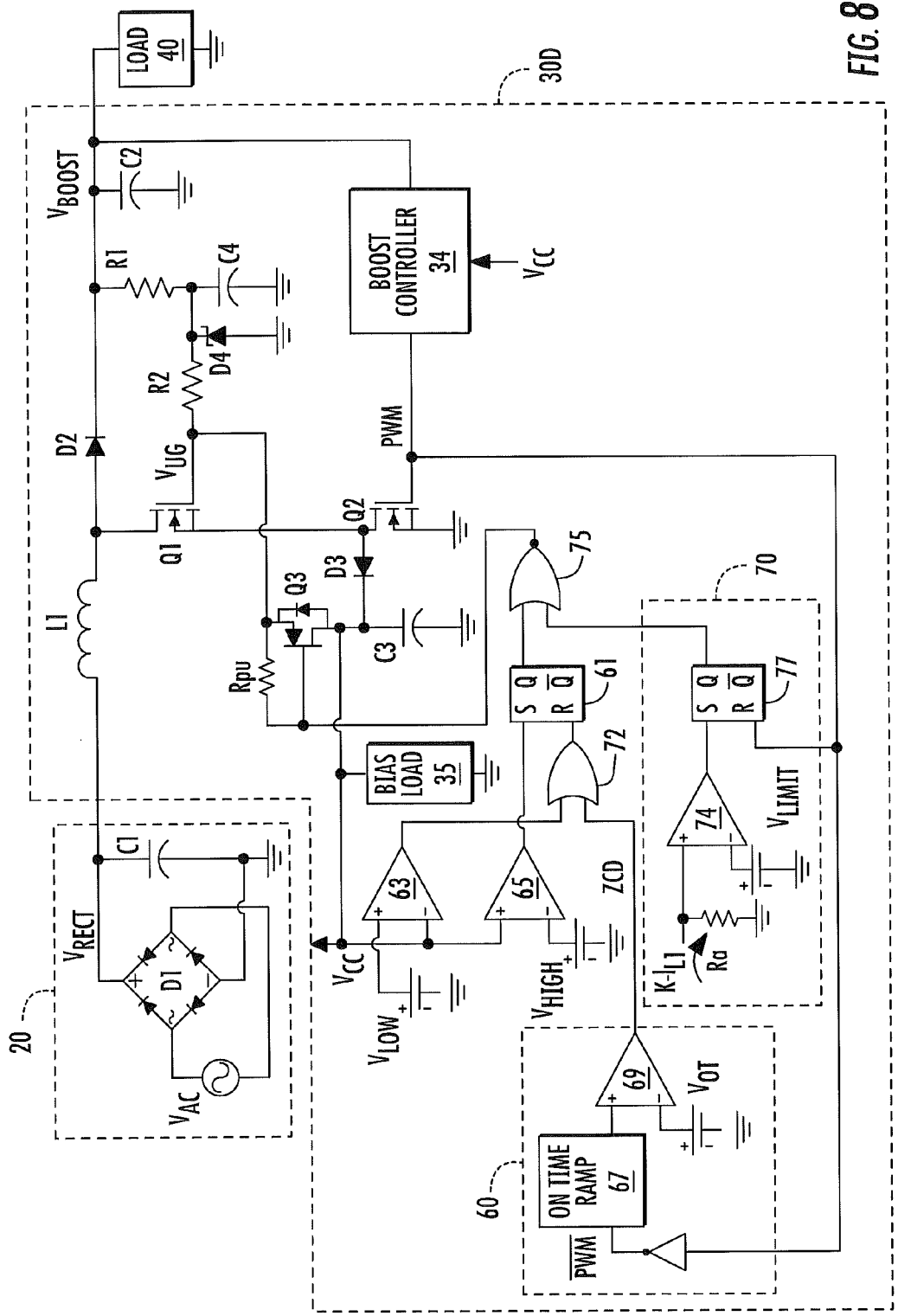
FIG. 8 is a circuit diagram of a power converter circuit according to further embodiments.

FIG. 8 is a schematic diagram of a voltage boost circuit 30D including both a zero cross detection circuit 60 and a peak current detector 70. In the voltage boost circuit 30D, bias voltage recharge is performed near the zero crossings of the rectified input voltage $V_{RECT}$ and is halted when the inductor current $I_{L1}$ exceeds a predetermined threshold.

Figure 9:
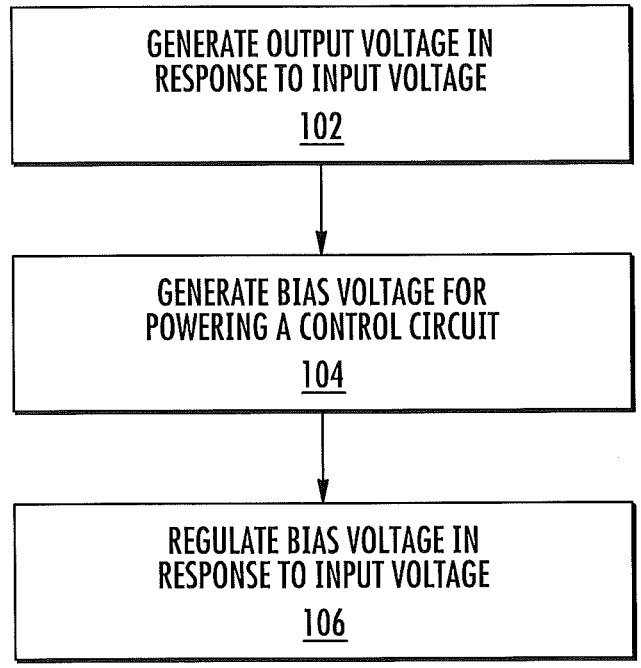
FIGS. 9 and 10 are flowcharts illustrating operations according to some embodiments.
Figure 10:
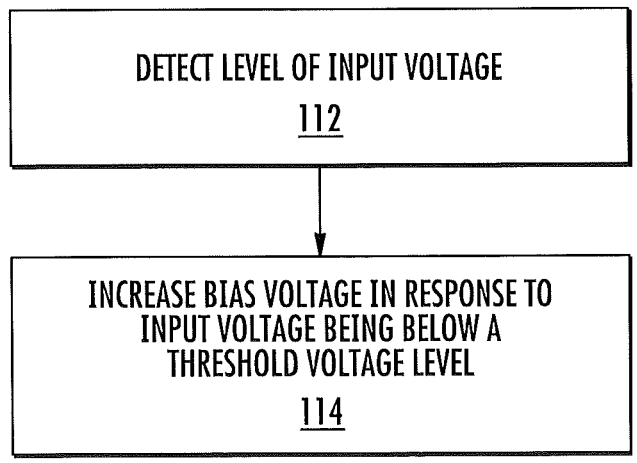

FIGS. 9-10 are flowcharts illustrating operations according to some embodiments. Referring to FIG. 9, some embodiments include generating an output voltage in response to an input voltage (block 102), generating a bias voltage for powering a control circuit (block 104) and regulating a level of the bias voltage in response to a level of the input voltage (block 106).

In particular, as illustrated in FIG. 10, regulating the level of the bias voltage may include detecting the level of the input voltage (block 112), and increasing the level of the bias voltage in response to detecting that the input voltage is below a threshold voltage level (block 114).

Operating the bias voltage charging circuitry in the synchronized mode using a zero cross detection circuit described in connection with FIGS. 4-6 and/or limiting the boost inductor current using the peak limit detector 70 may reduce the variation of loading in the output. Some loads, such as light emitting diodes (LEDs), may be sensitive to periodic disturbances. For example, in a solid state lighting apparatus including solid state LEDs, periodic disturbances may show up as light flicker in LEDs. The output current in passing through the boost diode D2 ramps down from the peak inductor current. The hysteretic mode bias regulator described in connection with FIGS. 2-3 may introduce asynchronous disturbances in the load current. Synchronizing the bias voltage recharge to the AC line frequency and/or limiting the peak inductor current may hide the disturbance within the output ripple.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A power conversion circuit, comprising:
a voltage boost circuit configured to generate an output voltage in response to an input voltage;
a boost controller configured to control operation of the voltage boost circuit in response to a bias voltage; and
a bias voltage generation circuit configured to generate the bias voltage, wherein the bias voltage generation circuit is configured to regulate a level of the bias voltage in response to a level of the input voltage;
wherein the bias voltage generation circuit is configured to detect the level of the input voltage and to increase the level of the bias voltage in response to detecting that the input voltage is below a threshold voltage level.

2. The power conversion circuit of claim 1, wherein the bias voltage generation circuit comprises a comparator that is configured to compare a level of the input voltage with the threshold voltage level.

3. The power conversion circuit of claim 1, wherein the voltage boost circuit comprises a switch, wherein the boost controller is configured to generate a pulse width modulation signal that controls operation of the switch, and wherein the bias voltage generation circuit is configured to detect the level of the input voltage by measuring an on-time of the pulse width modulation signal.

4. The power conversion circuit of claim 1, wherein the voltage boost circuit comprises a boost inductor configured to receive a rectified input voltage, a boost diode coupled to the boost inductor a boost capacitor coupled to the boost diode, a compound switch including a first switch coupled to the boost inductor and a second switch coupled to the first switch, wherein the boost controller is configured to control a state of the second switch; and wherein the bias voltage generation circuit comprises a bias capacitor coupled to a bias node, a bias rectifier coupled between the first switch and the bias node, and a switch between a control terminal of the first switch and the bias node;

wherein the bias voltage generation circuit is configured to disconnect the control terminal of the first switch from the bias node in response to detecting that the input voltage is below the threshold voltage level.

5. The power conversion circuit of claim 4, wherein the bias voltage generation circuit is further configured to compare a level of a current in the boost inductor to a current threshold and to connect the control terminal of the first switch to the bias node in response to the current in the boost inductor exceeding the current threshold.

6. The power conversion circuit of claim 4, further comprising:

a control bias circuit coupled to the control terminal of the first switch and configured to maintain a voltage on the control terminal of the first switch at a voltage level that is higher than a voltage level at the bias node when the control terminal of the first switch is disconnected from the bias node.

7. The power conversion circuit, of claim 6, wherein the bias voltage generation circuit is configured to maintain the first switch in an on-state by disconnecting the control terminal of the first switch from the bias node when either the level of the input voltage is below the threshold voltage level or the voltage level at the bias node is below a lower bias voltage threshold.

8. The power conversion circuit of claim 7, wherein the bias voltage generation circuit is configured to compare the voltage at the bias node to an upper bias voltage threshold and to connect the control terminal of the first switch to the bias node in response to detecting that the voltage at the bias node is greater than the upper bias threshold voltage.

9. A power conversion circuit, comprising:

a voltage boost circuit configured to generate an output voltage in response to a rectified input voltage signal, the voltage boost circuit including a first energy storage element;

a boost controller configured to control operation of the voltage boost circuit; and a bias voltage generation circuit configured to generate a bias voltage for operating the boost controller, wherein the bias voltage generation circuit comprises a second energy storage element, and wherein the bias voltage generation circuit is configured to transfer energy from the first energy storage element to the second energy storage element in response to a level of the rectified input voltage signal being below a threshold voltage level.

10. A method of operating a power conversion circuit, comprising:

generating an output voltage in response to an input voltage;

generating a bias voltage for powering a control circuit;

regulating a level of the bias voltage in response to a level of the input voltage;

detecting the level of the input voltage; and increasing the level of the bias voltage in response to detecting that the input voltage is below a threshold voltage level.

11. The method of claim 10, further comprising comparing a level of the input voltage with the threshold voltage level.

12. The method of claim 10, wherein the power conversion circuit comprises a switch, the method further comprising:

generating a pulse width modulation signal that controls operation of the switch; and detecting the level of the input voltage by measuring an on-time of the pulse width modulation signal.

13. The method of claim 12, wherein the switch comprises a compound switch including a first switch coupled to a boost inductor and a second switch coupled to the first switch, the method further comprising:

disconnecting a control terminal of the first switch from a bias node at which the bias voltage is output in response to detecting that the input voltage is below a threshold voltage level.

14. The method of claim 13, further comprising comparing a level of a current in the boost inductor to a current threshold; and connecting the control terminal of the first switch to the bias node in response to the current in the boost inductor exceeding the current threshold.

15. The method of claim 13, further comprising:

maintaining a voltage on the control terminal of the first switch at a voltage level that is higher than a voltage level at the bias node when the control terminal of the first switch is disconnected from the bias node.

16. The method of claim 15, further comprising maintaining the first switch in an on-state by disconnecting the control terminal of the first switch from the bias node when either the level of the input voltage is below the threshold voltage level or the voltage level at the bias node is below a lower bias voltage threshold.

17. The method of claim 16, further comprising:

comparing the voltage at the bias node to an upper bias voltage threshold and connecting the control terminal of the first switch to the bias node in response to detecting that the voltage at the bias node is greater than the upper bias threshold voltage.

18. A power conversion circuit, comprising:

a voltage boost circuit configured to generate an output voltage in response to an input voltage, wherein the voltage boost circuit includes a cascade switch including a high voltage switch and a control switch wherein the high voltage switch comprises an enhancement mode MOSFET;

a boost controller configured to control operation of the control switch; and a bias voltage generation circuit coupled to a gate and to a source of the high voltage switch, wherein the bias voltage generation circuit is configured to provide a first gate voltage to the gate of the high voltage switch that is sufficient to turn on the high voltage switch when the control switch is in an ON state;

a gate bias circuit coupled to the gate of the high voltage switch and to an output terminal of the voltage boost circuit, wherein the gate bias circuit is configured to provide a second gate voltage to the gate of the high voltage switch that is higher than the first gate voltage.

19. The power conversion circuit of claim 18:

wherein the bias voltage generation circuit comprises a bias capacitor having a first terminal coupled to a bias voltage supply node and a second terminal coupled to ground, and a bias selection switch coupled between the bias voltage supply node and the gate of the high voltage switch;

wherein the source of the high voltage switch is coupled to the bias voltage supply node; and wherein the bias voltage generation circuit is configured to selectively couple the gate of the high voltage switch to the bias supply node through the bias selection switch in response to a voltage level at the bias supply node.

20. The power conversion circuit of claim 18, Wherein each of the first gate voltage and the second gate voltage is sufficient to place the control switch into a saturated mode.

21. The power conversion circuit of claim 18, wherein the second gate voltage is sufficient to turn on the high voltage switch when the control switch is in an OFF state.

\* \* \* \* \*